United States Patent [19]
Meijer-Hoffman et al.

[11] 4,247,645
[45] Jan. 27, 1981

[54] PROCESS FOR REMOVING MELAMINE FROM MELAMINE-CONTAINING LIQUIDS

[75] Inventors: Lucia R. M. Meijer-Hoffman; Pieter H. de Jonge, both of Geleen, Netherlands

[73] Assignee: Stamicarbon, B.V., Geleen, Netherlands

[21] Appl. No.: 22,598

[22] Filed: Mar. 19, 1979

[30] Foreign Application Priority Data

Mar. 22, 1978 [NL] Netherlands ............... 7803073

[51] Int. Cl.³ .............................................. C02F 3/00
[52] U.S. Cl. ................................ 435/262; 435/227; 435/824; 435/828; 435/829; 435/875; 435/859; 435/839; 435/840; 435/883; 210/611
[58] Field of Search ................... 435/262; 210/2, 11

[56] References Cited

U.S. PATENT DOCUMENTS 3,926,795  12/1975  Saldick ............................. 210/11
3,940,332  2/1976   Kato et al. ........................ 210/2
4,013,757  3/1977   Berkowitz et al. ............. 210/59 X
4,133,752  1/1979   Kurane et al. .................. 435/262 X

FOREIGN PATENT DOCUMENTS 53-2949  2/1978  Japan.

Primary Examiner—Lionel M. Shapiro
Attorney, Agent, or Firm—Cushman, Darby & Cushman

[57] ABSTRACT

A process for removing melamine from liquids containing melamine by biological means. The aqueous solution or suspension of melamine is brought into contact with microorganisms or enzyme preparations having melaminase activity, and the resulting mixture is maintained under anaerobic conditions whereby at least a portion of the melamine is biodegraded.

12 Claims, No Drawings

PROCESS FOR REMOVING MELAMINE FROM MELAMINE-CONTAINING LIQUIDS

BACKGROUND OF THE INVENTION

This invention relates to a process for removing melamine from melamine-containing liquids, and in particular from melamine-containing waste water.

Waste water originating from a melamine producing plant, or a melamine processing plant, may contain large quantities of dissolved or suspended melamine. Since the discharge thereof into surface waters is undesirable and often subject to restrictions and levies, various attempts have been made to find methods for removing this melamine from waste water. These previous attempts however, have failed to achieve such melamine removal by biodegradation. (Chem. Abstr. 75,254195; 1971 and U.S. Pat. No. 4,013,757.

DESCRIPTION OF THE INVENTION

It has now surprisingly been found that it is possible to remove melamine from waste water by biological means. Specifically, it has been found in accordance with the process of the present invention that melamine can be biodegraded by bringing an aqueous solution or suspension thereof into contact with one or more species of microorganisms or enzyme preparations having melaminase activity, under anaerobic conditions.

As used herein, the term melaminase activity shall be understood to mean any effect of microorganisms or enzyme preparations on melamine that results in the breaking of the melamine ring structure. For instance, this may be effected by hydrolase activity. Additionally, the term melamine as used herein is to be understood to mean not only melamine itself, but also derivatives of melamine such as ammeline and ammelide.

The medium providing the melaminase activity preferably contains microorganisms in the form of a microorganism containing activated sludge. Such activated sludge may, for example, be derived from either domestic or industrial waste water purification facilities. However, the microorganisms may also be provided in the form of a pure culture or a mixed culture.

Preferably the microorganisms utilized in this process will be one or more strains selected from the genera Achromobacter, Aerobacter, Pseudomonas, Micrococcus, Staphylococcus, Bacillus, Brevibacterium and Alcaligenes, and preferably selected from the species *Achromobacter lacticum, Aerobacter aerogenes, Pseudomonas aeruginosa, Micrococcus albus, Staphylococcus aureus, Bacillus pasteurii, Bacillus subtilis, Brevibacterium roseum* and *Alcaligenes faecalis.*

Particularly suitable for carrying out the process of this invention are strains of microorganisms selected from the group consisting of *Achromobacter lacticum* NCIB 8208, *Aerobacter aerogenes* NCIB 11402, *Pseudomonas aeruginosa* NCIB 11403, *Micrococcus albus* NCIB 11404, *Staphylococcus aureus* ATCC 8532, *Bacillus pasteurii* NCIB 11360, ATCC 11859 and NCIB 11395, *Bacillus subtilis* ATCC 15841, *Brevibacterium roseum* ATCC 13825 and *Alcaligenes faecalis* NCIB 11396.

When utilizing the living microorganisms as a pure culture, a mixed culture or in the form of a sludge, preferably an assimilable carbon source is added, and possibly also phosphates. As a carbon source, carbohydrates are preferred, particularly saturated carboxylic acids or salts thereof such as sodium-acetate, molasses, or alkanols such as the bottom product of a methanol distillation.

Enzyme preparations that may be utilized in the process of this invention are preferably obtained from one or more of the above-mentioned species of microorganisms. These enzyme preparations can be utilized and applied in a number of different ways, such as in pure form, as a crude preparation, or as a cell preparation.

The various species of microorganisms, as well as the enzyme preparations, can be utilized either in free form or immobilized on a carrier. A number of known carrier materials may be utilized such as, for instance, sand, glass, kieselguhr, synthetic or natural sponge, or resins having reactive groups. In addition to attaching the microorganisms and/or enzyme preparations to a carrier, other immobilization techniques may be used including the cross-linking of enzymes, crude enzyme preparations or cell material with polyfunctional reagents such as glutaric dialdehyde, encapsulation in polyacrylamide latices, or by attaching them by cross-linking and/or coagulating reagents to threads or sheet forms.

It has been found that the biodegradation of melamine only takes place under anaerobic conditions, and thus no detectable molecular oxygen should be present in the mixture being biodegraded in order for the process to operate properly. In practice, this means that no more than approximately 0.05 ppm of oxygen may be present in the liquid. When utilizing microorganisms in the form of an aqueous suspension, if the molecular oxygen concentration is not too high, that is less than about 0.1 ppm, the microorganisms themselves first consume the oxygen that may still be present. Only after the molecular oxygen concentration is sufficiently low is melamine degraded. During the period of time that melamine is not yet being degraded, this pH is, if necessary, maintained at the desired value by adding ammonium hydroxide. On the other hand, if an enzyme preparation is being used, care should be taken that the mixture to be treated is almost free from molecular oxygen.

Various species of microorganisms have been found to be inhibited by the presence of a significant quantity of nitrite, nitrate, sulphite and/or sulphate ions. It is therefore preferable that the concentration of these ions, especially of nitrate/nitrite, be at a level below some tens of milligrams per liter, preferably below about 10 ppm. These compounds are usually not present in the effluent of a melamine producing plant. However, if this effluent is treated in a waste water purification plant, possibly in admixture with other effluent especially nitrate and nitrite will be present.

The average residence time of the aqueous solution or suspension of melamine, that is the time during which the solution or suspension is maintained under anaerobic conditions and in contact with the medium having melaminase activity, varies between 3 and 24 hours although shorter times are also possible. The optimum time lies between these limits, taking into consideration the economics of the situation.

Preferably the process is carried out at a temperature of between about 15° and 60° C. Beyond these limits many of the microorganisms and/or enzyme preparations will no longer be active, although certain species may still have activity. Most preferably, however, temperatures between 30° and 45° C. are applied. Most microorganisms and enzyme preparations show optimum activity within this latter temperature range.

The pH of the mixture during biodegradation should preferably be above 8 and most preferably between about 8.5 and 10. At these rather high pH values, especially for microorganisms, the process of the invention appears to proceed well.

Any apparatus suitable for establishing contact between the various types of microorganisms and/or enzyme preparations with the melamine containing solution or suspension, while excluding molecular oxygen, may be utilized in this invention. Examples of suitable apparatus are a fermentor and a fixed or fluidized bed of activated material, which material may, but need not, be on a carrier. The process can also be performed in a stirred reactor, provided that no appreciable amount of oxygen can enter the liquid.

When using activated sludge in this process, it is preferred to use an upward-flow reactor. Such a reactor has the advantage that the sludge need not be separated from the mixture after biodegradation, and the reactor contents themselves can be kept free from molecular oxygen in a relatively simple manner. Moreover, at the same residence time the melamine removal in such an upward-flow reactor is better than in a conventional stirred reactor.

The process of the present invention is particularly applicable to the purification of waste water from a melamine plant, but also may be used for the purification of waste water from a melamine processing plant. An additional advantage of this process is that urea and other compounds resembling melamine, such as ammeline and ammelide, may also be biodegraded under the same conditions.

The degradation of melamine results in the formation of ammonia, as well as other compounds. This ammonia can be recovered in a simple manner by absorption, for instance with the aid of steam.

Certain specific aspects of the invention will be further elucidated by means of the following examples.

EXAMPLE 1

A sludge suspension with a pH of 6.8 and a dry matter content of 1.5 weight %, originating from an industrial waste water purification plant, was raised to a pH of 9.0 with the aid of $NH_4OH$. To this sludge suspension melamine and sodium acetate were added in an amount sufficient to form a mixture containing 1.0 grams/liter of melamine and 5 grams/liter of sodium acetate.

A glass 300 ml flask was filled to the brim with this suspension and closed with a glass stopper so that no oxygen could be absorbed into the suspension. The closed flask was placed in a rotating shaking device and maintained at a temperature of 30° C. After three days, 95% of the melamine originally present appeared to have disappeared. At that moment, a further quantity of melamine was added sufficient to raise the melamine content to 2.0 grams/liter. After one additional day almost 99% of the added melamine had been degraded. The results of this test are given in Table 1.

Table 1

| time (days) | melamine content (ppm) | oxygen content (ppm) | remark |
|---|---|---|---|
| 0 | 1000 | <5 | |
| 3 | 49 | <0.05 | after |
| 3 | 2049 | <0.05 | adding melamine |
| 4 | 78 | <0.05 | |

From this test it clearly appears that it is possible to biodegrade melamine under anaerobic conditions.

COMPARATIVE EXAMPLE

A glass flask was partly filled with a melamine-containing suspension of the same composition as the initial mixture formed in Example 1. The flask was closed with wadding so that oxygen absorption into the mixture from the air could take place. The further procedure was analogous with Example 1. The results were as follows:

Table 2

| time (days) | melamine content (ppm) | oxygen content (ppm) |
|---|---|---|
| 0 | 1000 | 4–5 |
| 3 | 1000 | 4–5 |
| 4 | 1000 | 4–5 |
| 20 | 1000 | 4–5 |

From this comparative example it follows that degradation of melamine occurs only under anaerobic conditions. Comparing the results of this comparative example with Example 1 makes it clear that the microorganisms having melaminase activity first consume almost all oxygen present before melamine is degraded.

In the following examples references to anaerobic or melamine-degrading sludge suspension should be understood to mean, unless expressly stated otherwise, a sludge mixture as obtained in the foregoing example after the initial three days.

EXAMPLE 2

In a closed flask an anaerobic sludge suspension as in Example 1, with a dry matter content of approximately 1.5 weight %, was stirred at approximately 37° C. As a carbon source, 2 ml of acetic acid (96–98%) were added per liter of suspension. In a series of tests, a number of test samples were made up in which the initial melamine content was varied from 1.0 to 7.5 grams/liter. The pH of the sludge mixture was 6.8. When the melamine degradation had been initiated the pH increased to 8.5 and remained between 8.5 and 10 without further corrections. The results of these tests are compiled on Table 3, and show that melamine can be biodegraded over a wide range of concentrations, up to the concentrations where melaime crystallizes due to saturation of the solution.

Table 3

| melamine content (ppm) | residence time (hours) | melamine degradation % |
|---|---|---|
| 1000 | 22–24 | 98 |
| 2500 | 22–24 | 96 |
| 4000 | 22–24 | 92 |
| 6000 | 22–24 | 89 |
| 7500 | 22–24 | 87 |

EXAMPLE 3

Melamine degradation in the presence of different assimilable carbon sources was tested in this experiment.

In a series of closed 300 ml flasks anaerobic sludge suspensions with a dry matter content of approximately 1.5 weight % were stirred at approximately 37° C. The pH was raised from 6.9 to 8.5 with $NH_4OH$. To these suspensions melamine was added until the melamine concentration was either 1.0 or 2.5 grams/liter as indicated. The following were added as a source of assimilable carbon: beet molasses, acetic acid (96–98%) and the bottom product from a methanol distillation (fusel oil). The results of this experiment are compiled on Table 4, and show that different kinds of carbon sources can be used.

Table 4

| carbon source type | conc. | melamine content ppm | residence time hours | melamine degradation % |
|---|---|---|---|---|
| beet molasses | 2 g/l | 2500 | 30 | 96 |
| acetic acid | 2 ml/l | 2500 | 30 | 98 |
| fusel oil | 10 ml/l | 1000 | 72 | 60 |

EXAMPLE 4

To a melamine-degrading sludge suspension with a dry matter content of 0.5 grams/liter, sufficient melamine was added to raise the melamine concentration to 1000 ppm, after which the pH of the mixture was 9.0. The flask was closed with a glass stopper and its contents were stirred at room temperature. An identical test was caried out with a sludge mixture containing 5.0 grams/liter of dry matter, to which sufficient melamine was added to raise the melamine concentration of the mixture to 2000 ppm. The residual melamine concentration was then measured after 1, 3 and 5 hours, and the results are compiled in Table 5. This test shows that with different amounts of micro-organisms the biodegradation of melamine can be performed.

Table 5

| t in hours | melamine content in ppm | |
|---|---|---|
| | 0.5 g/l of dry matter | 5.0 g/l of dry matter |
| t = 0 | 1000 | 2000 |
| t = 1 | | 97 |
| t = 3 | 414 | |
| t = 5 | 98 | 48 |

EXAMPLE 5

Sludge was separated from a melamine-degrading sludge suspension by centrifuging (20 minutes at 10° C., 10,000 rpm). The sludge paste thus obtained was thereafer diluted with filtrate until the dry matter content was approximately 2 grams/liter. The remainder of the filtrate was filtered through a filter having a pore width of 0.45$\mu$, so as to render the filtrate entirely cell-free.

The diluted sludge paste and the filtrate thus obtained were put into separate flasks, and to each flask 1.0 grams of melamine and 2.5 grams of sodium acetate were added per liter of flask contents. $N_2$ gas was led through both flasks until the oxygen concentration was less than 0.05 ppm. Then the flasks were closed and stirred at 30° C. The residual melamine concentration in each flask was periodically measured, and the results are compiled in Table 6.

Table 6

| time in days | melamine content in ppm | |
|---|---|---|
| | sludge suspension | filtrate |
| t = 0 | 1000 | 1000 |
| t = 1 | 89 | 1000 |
| t = 5 | 21 | 1000 |
| t = 12 | 0 | 1000 |
| t = 21 | | 1000 |

From this experiment it can be concluded that the melamine-degrading activity of the activated sludge is not dependent on an extra-cellular enzyme.

In four closed 300 ml flasks a melamine-degrading sludge suspension with a dry matter content of approximately 1.5 weight % was stirred under anaerobic conditions at 37° C. The pH was increased from 6.8 to 8.5 with $NH_4OH$. Acetic acid (96–98%) was added in an amount of 2 ml per liter as a carbon source.

To these four sludge suspensions, four components often occurring in waste water from a melamine plant were added, that is, ammeline, ammelide, urea and guanidine. The results are given in Table 7.

Table 7

| concentration ppm | | residence time hours | degradation % |
|---|---|---|---|
| urea | 7500 | 15 | 99 |
| guanidine | 700 | 16 | 60 |
| ammeline | 1000 | 16 | 98 |
| ammelide | 1000 | 16 | 85 |

EXAMPLE 7

To a melamine-degrading sludge suspension with a dry matter content of approximately 2 weight %, various amounts of melamine and nitrate were added. The suspension was stirred at room temperature. At different points of time samples were taken and analyzed. The results are compiled in Table 8. The respective concentrations are given on the table in ppm, and "—" indicates that no determination was made.

Table 8

| Time in days | 0 | | 1 | | 2 | | 3 | | 4 | |
|---|---|---|---|---|---|---|---|---|---|---|
| test | $NO_3^-$ | melamine | $NO_3^-$ | melamine | $NO_3^-$ | melamine | $NO_3^-$ | melamine | $NO_3^-$ | melamine |
| 1 | 8 | 2095 | 0 | 208 | 0 | 129 | — | — | — | — |
| 2 | 87 | 2110 | 53 | 1965 | 18 | 1940 | 12 | 1940 | 10 | 1900 |
| 3 | 274 | 2055 | 232 | 1950 | 204 | 1900 | 202 | 1900 | 186 | 1900 |

From these tests it follows that the presence of nitrate ions inhibits the degradation of melamine.

From further tests it has appeared that the addition of 10 ppm of nitrate in the form of $KNO_3$ to a melamine-degrading sludge suspension resulted in 100% inhibition of the melamine degradation.

EXAMPLE 8

The tests of this example were conducted to determine the melamine degradation effectiveness of various pure cultures of microorganisms.
Culture Medium:
 yeast extract (Bacto 0127): 20.0 g
 peptone (Bacto 118): 20.0 g
 $K_2HPO_4$: 1.0 g
 $MgSO_4.7H_2O$: 0.1 g
 distilled water: 1000 ml This culture medium was twice sterilized for 15 minutes at 120° C., with one day in between.

Test Medium I:
  MgSO$_4$.7H$_2$O: 0.4 g
  K$_2$HPO$_4$: 1.0 g
  CaCl$_2$.2H$_2$O: 0.05 g
  FeSO$_4$.7H$_2$O: 10 mg
  MnSO$_4$.5H$_2$O: 3 mg
  ZnSO$_4$.7H$_2$O: 0.25 mg
  CuSO$_4$.5H$_2$O: 0.25 mg
  H$_3$BO$_3$: 0.25 mg
  Na$_2$MoO$_4$.2H$_2$O: 0.05 mg
  melamine: 0.5 g
  Na acetate: 5.0 g
  distilled water: 1000 ml The pH was increased to 9.0-9.2 with 2 N. NaOH. This medium was sterilized at 120° C. for 15 minutes.

Test Medium II:
This test medium was prepared in the same manner as Test Medium I, except without Na acetate.

Various microorganisms were grafted in separate 300 ml flasks filled with 150 ml of culture medium of the above composition. To each flask 1 ml of 12.5% NH$_3$ in water was added, resulting in a pH of 9.0. The microorganisms were then aerobically incubated at 28°-30° C. in a rotating shaker. After 16 hours of incubation an additional 1 ml of 12.5% NH$_3$ in water was added. The cells were collected 40 hours after seeding by centrifuging (20 minutes at 10° C., and 10,000 revolutions per minute). The wet cell paste obtained by centrifuging was suspended in flasks containing the test media. The flasks were filled to the brim and closed with a glass stopper. The tests were carried out in a rotating shaker at 28°-30° C. The results are given in Table 9.

Table 9

| micro-organisms | dry cells mg/l | test med-ium | melamine content in ppm | | | |
|---|---|---|---|---|---|---|
| | | | t = 0 | t = 3 days | t = 5 days | t = 10 days |
| Achromobacter lacticum NCIB 8208 | 743 | I | 500 | 500 | 486 | 294 |
| Aerobacter aerogenes NCIB 11402 | 749 | I | 500 | 498 | 228 | 8 |
| Pseudomonas aeruginosa NCIB 11403 | 649 | I | 500 | 500 | 24 | 0 |
| Micrococcus albus NCIB 11404 | 305 | I | 500 | 480 | 66 | 0 |
| Staphylococcus aureus ATCC 8532 | 410 | I | 500 | | | 179 |
| Bacillus pasteurii NCIB 11360 | 990 | I | 500 | 84 | 42 | 0 |
| Bacillus subtilis ATCC 15841 | 815 | I | 500 | | | 36 |
| Bacillus pasteurii ATCC 11859 | 914 | I | 500 | | | 56 |
| Brevibacterium roseum ATCC 13825 | 923 | I | 500 | 118 | 40 | 0 |
| Brevibacterium roseum ATCC 13825 | 900 | II | 500 | 500 | 120 | 0 |
| Bacillus pasteurii NCIB 11395 | 881 | I | 500 | 479 | 63 | 0 |
| Bacillus pasteurii NCIB 11395 | 798 | II | 500 | 480 | 145 | 0 |

Table 9-continued

| micro-organisms | dry cells mg/l | test med-ium | melamine content in ppm | | | |
|---|---|---|---|---|---|---|
| | | | t = 0 | t = 3 days | t = 5 days | t = 10 days |
| Alcaligenes faecalis NCIB 11396 | 1020 | I | 500 | 468 | 7 | 0 |
| Alcaligenes faecalis NCIB 11396 | 980 | II | 500 | 500 | 65 | 0 |

After the melamine degradation had been initiated (generally within 3-5 days), additional melamine in powder form could be added and thereafter degraded. For example, if an additional 1.0 grams/liter of melamine was added, the melamine content would generally drop to less than 0.2 grams/liter after about 24-28 hours.

EXAMPLE 9

A double-walled glass column with a length of 1 meter and an internal diameter of 0.09 meters was filled with 6.4 liters of a suspension of melamine-degrading sludge having a solid matter content of 5 weight %. With the aid of NH$_4$OH the pH was brought to 8.5, and the temperature in the column was maintained at between 37° and 45° C. during the entire test.

Waste water from a melamine plant was continuously fed into the bottom of the column at a rate of 0.007 liters/minutes. This waste water had the following composition.

Table 10

| | ppm |
|---|---|
| melamine | 1925 |
| urea | 620 |
| guanidine | 50 |
| ammeline | 50 |
| ammelide | 50 |
| NH$_3$—N | 870 |

For every liter of waste water, 2 grams of beet molasses and 0.1 ml of phosphoric acid (85%) were added.

The remaining concentrations of the various materials in the waste water, after the biological purification in the upward flow glass column, are listed in Table 11.

Table 11

| | ppm | degradation in % |
|---|---|---|
| melamine | 60 | 97 |
| urea | 10 | 98 |
| guanidine | 10 | 80 |
| ammeline | 2.5 | 95 |
| ammelide | 10 | 80 |
| NH$_3$—N | 2360 | — |

On the basis of these data a nitrogen balance was made of the various components dissolved in the waste water before and after the purification. The result is given in Table 12.

Table 12

| | before | after |
|---|---|---|
| melamine-N | 1283 | 40 |
| ureua-N | 289 | 5 |
| guanidine-N | 36 | 7 |
| ammeline-N | 27 | 1 |
| ammelide-N | 22 | 4 |
| NH$_3$—N | 870 | 2360 |
| Kjeldahl-N calculated | 2527 | 2417 |

Table 12-continued

|  | before | after |
|---|---|---|
| Kjeldahl-N measured | 2580 | 2450 |

Taking into account the measuring accuracy involved, the amounts of kjeldahl-N before and after the purification are essentially the same. This indicates that the nitrogen originating from the melamine is not assimilated by the microorganisms. From Table 12 it can also be concluded that the melamine is degraded to $NH_3$ and $CO_2$.

EXAMPLE 10

The procedure of Example 9 was continued for a number of months, with varying compositions of waste water from the melamine plant. In Table 13 the limits of the composition of the waste water actually fed are indicated, as are the limits of the efficiency of the purification.

Table 13

| composition of waste water from a melamine plant g/l | purification efficiency in % |
|---|---|
| melamine | 1.8–3.0 | 92–98 |
| ureua | 0.6–1.2 | 98–100 |
| guanidine | 0.05–0.23 | 60–85 |
| ammeline | ≦0.05 | ≧96 |
| ammelide | ≦0.05 | ≧80 |

What is claimed is:

1. A process for removing melamine from melamine-containing liquids essentially comprising bringing an aqueous solution or suspension of melamine into contact with a medium having melaminase activity, selected from the group consisting of microorganisms and enzyme preparations having melaminase activity, or a combination thereof, and maintaining the resulting mixture under anaerobic conditions, with a molecular oxygen concentration of less than about 0.1 ppm, and maintaining the nitrate ion concentration of said mixture at less than about 10 ppm, whereby at least a portion of said melamine is biodegraded.

2. The process of claim 1 wherein the total concentration of nitrite and nitrate ions in said mixture is less than 10 ppm.

3. The process of claims 1 or 2 wherein said medium is present in the form of microorganism containing activated sludge.

4. The process of claim 3 wherein said aqueous solution or suspension of melamine is brought into contact with said microorganism containing activated sludge in an upward flow reactor.

5. The process of claims 1 or 2 wherein said medium having melaminase activity contains at least one strain of microorganisms selected from the genera consisting of Achromobacter, Aerobacter, Pseudomonas, Micrococcus, Staphylococcus, Bacillus, Brevibacterium and Alcaligenes.

6. The process of claim 5 wherein said medium contains at least one strain of microorganisms selected from the species consisting of *Achromobacter lacticum, Aerobacter aerogenes, Pseudomonas aeruginosa, Micrococcus albus, Staphylococcus aureus, Bacillus pasteurii, Bacillus subtillis, Brevibacterium roseum* and *Alcaligenes faecalis*.

7. The process of claim 6 wherein said medium contains at least one strain of microorganisms selected from the group consisting of *Achromobacter lacticum* NCIB 8208, *Aerobacter aerogenes* NCIB 11402, *Pseudomonas aeruginosa* NCIB 11403, *Micrococcus albus* NCIB 11404, *Staphylococcus aureus* ATCC 8532, *Bacillus pasteurii* NCIB 11360, ATCC 11859 and NCIB 11395, *Bacillus subtilis* ATCC 15841, *Brevibacterium roseum* ATCC 13825 and *Alcaligenes faecalis* NCIB 11396.

8. The process of claims 1 or 2 wherein the pH of said mixture is maintained at a value of between 8 and 11 during the biodegradation of said melamine.

9. The process of claims 1 or 2 wherein an assimilable carbon source is added to said mixture.

10. The process of claims 1 or 2 wherein the temperature of said mixture is maintained at between 15° and 60° C. during the biodegradation of said melamine.

11. The process of claim 10 wherein said temperature is maintained between 30° and 45° C.

12. The process of claims 1 or 2 wherein the average time of contact between said aqueous solution or suspension of melamine and said medium is between 3 and 24 hours.

* * * * *